United States Patent
Adusumilli

(10) Patent No.: US 6,412,030 B1
(45) Date of Patent: Jun. 25, 2002

(54) SYSTEM AND METHOD TO OPTIMIZE READ PERFORMANCE WHILE ACCEPTING WRITE DATA IN A PCI BUS ARCHITECTURE

(75) Inventor: Swaroop Adusumilli, Tempe, AZ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/293,077

(22) Filed: Apr. 16, 1999

(51) Int. Cl.[7] .............................................. G06F 13/28
(52) U.S. Cl. ............................... 710/33; 710/2; 710/46; 710/62
(58) Field of Search .................................. 710/5, 11, 33, 710/35, 48, 51, 52, 2, 15, 31, 36, 46, 47, 49, 101, 62, 63, 129

(56) References Cited

U.S. PATENT DOCUMENTS

| | | | | |
|---|---|---|---|---|
| 5,448,704 A | * | 9/1995 | Spaniol et al. | 710/130 |
| 5,564,027 A | * | 10/1996 | Bui et al. | 710/129 |
| 5,581,714 A | * | 12/1996 | Amini et al. | 710/128 |
| 5,613,075 A | | 3/1997 | Wade et al. | 395/287 |
| 5,652,848 A | * | 7/1997 | Bui et al. | 710/129 |
| 5,864,876 A | * | 1/1999 | Rossum et al. | 711/206 |
| 5,933,611 A | * | 8/1999 | Shakkarwar | 710/126 |
| 5,970,069 A | * | 10/1999 | Kumar et al. | 370/402 |
| 6,128,711 A | * | 10/2000 | Duncan | 711/155 |
| 6,266,723 B1 | * | 7/2001 | Ghodrat et al. | 710/100 |

FOREIGN PATENT DOCUMENTS

EP   747 831 A2   12/1996   .......... G06F/13/40

OTHER PUBLICATIONS

"External Post Write Buffer Protocol For Personal Computers" IBM Technical Disclosure Bulletin., vol. 37, No. 9, Sep. 1994, pp. 163–167, XP000473371. IBM Corp. New York., US ISSN: 0018-8689 the whole document.

* cited by examiner

Primary Examiner—Jeffrey Gaffin
Assistant Examiner—Rijue Mai
(74) Attorney, Agent, or Firm—Peter Zawilski

(57) ABSTRACT

The present invention is a system and method that minimizes discarding of a pending read transaction in a peripheral component interconnect (PCI) bus architecture due to an arrival of a write request while maintaining appropriate transaction ordering. The read/write optimizing system and method of the present invention optimizes read performance by continuing to process a pending read transaction under appropriate conditions while partially performing the write request and inhibiting its completion. In one embodiment of the read/write optimizing system and method of the present invention, a write transaction is inhibited by tracking or storing an inhibited write transaction target address if a pending read transaction address is not within a range of an inhibited write transaction address. For example, a target address associated with an inhibited write transaction is temporarily latched in a write address register until a pending read transaction is completed or terminated. During the same time frame the inhibited write transaction is also partially processed by latching write data in a target write buffer if a target is prepared and a pending read transaction address does not come within a range of an inhibited write transaction address as the pending read and inhibited write transactions are processed.

7 Claims, 3 Drawing Sheets

SYSTEM AND METHOD TO OPTIMIZE READ PERFORMANCE WHILE ACCEPTING WRITE DATA IN A PCI BUS ARCHITECTURE

The present invention relates to the field of electronic communications systems and methods. More particularly, the present invention relates to a system and method to optimize read performance while accepting write data in a peripheral communications interconnect (PCI) bus architecture.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems include processors that have facilitated increased productivity and reduced costs in analyzing and communicating data, ideas and trends in most areas of business, science, education and entertainment. Frequently, electronic systems designed to provide these results include a variety of components that communicate with each other via a communication bus such as a peripheral component interconnect (PCI) bus. The order and speed at which the components communicate with one another over the bus without having to repeat read and write commands has a substantial impact on the performance of the computer system.

Typically a bus consists of several lines of electrically conductive material. The bus permits electrical signals representing data and control instructions to be readily transmitted between different components (agents) coupled to the bus. The industry standard PCI specification dictates that when a PCI agent requires the use of a PCI bus to transmit or receive data, the PCI agent requests PCI bus "ownership" from a PCI arbiter. The PCI agent requesting ownership is referred to as a PCI initiator agent, or master device. Typically, each of the PCI agents may independently act as a PCI initiator agent and request PCI bus ownership. The PCI agent the PCI initiator agent attempting to communicate with is referred to as a PCI target agent or slave device. After the PCI initiator agent has been granted PCI bus ownership that the PCI initiator agent attempts to access the PCI target agent and initiate a PCI transaction (e.g., data transfer).

The PCI initiator agent begins the PCI transaction by identifying or addressing the PCI target agent during the address phase of the PCI transaction. Once the PCI target agent senses it is being addressed, continuation of a PCI transaction is dependent on the PCI target agent. If the PCI target agent indicates it is ready the PCI transaction continues. However, if the PCI target agent is not ready for the PCI transaction to continue, it signals the PCI initiator agent to retry. For example, if an initiator issues a read command to a target the target usually registers the read as a delayed or pending read request. In a pending read request situation the target issues a retry to the initiator immediately to avoid tying up the PCI bus while the target locates the information and downloads it to a read buffer. By signaling a retry, the PCI target agent is instructing the PCI initiator agent to stop the current PCI transaction and try to complete it later. However, while the target is servicing the read request another initiator (or the same initiator) could request the target with postable write data.

Postable write data to the same address or location associated with a read command creates a potential for deadlock and coherency problems on the PCI bus that is addressed by PCI 2.2 specification. If a target decides to accept the write data, according to PCI 2.2 specification it should invalidate or discard the pending delayed read request in order to avoid a data coherency problem. More information details regarding deadlocks and coherency issues on Read Transactions with intermediate write transactions are addressed in the Appendix E of PCI Local Bus 2.2 specification under the subsection titled "Ordering of Transactions". While discarding a delayed read request addresses some of the coherency issues it severely degrades read performance, especially in situations where the condition repeats itself quickly.

Given the general proposition that the faster information and signals are communicated, the better the performance of a computer system, most PCI initiator agents are designed to complete their access in the minimum time possible. Accordingly, when the PCI initiator agent receives a retry from the PCI target agent, the PCI initiator agent deasserts the request for the minimum time allowed by PCI standards (i.e., two PCI clocks) and then retries the access. However, the PCI initiator agent's quickly repeated retry attempts often occur before the PCI target agent has had sufficient time to clear the condition that caused it to issue the retry in the first place.

Repeating pending read quest requests significantly impacts a system's performance capabilities. For example, much of a computer systems functionality and utility is realized through the use of components referred as peripheral devices. Frequently the speed at which peripheral devices interact with the rest of the computer system is critical. For many peripheral devices, such as graphics adapters, full motion video adapters, small computer system interface (SCSI) host bust adapters, and the like, it is imperative that large block data transfers be accomplished expeditiously. For example, the speed at which a graphics adapter can read information from a memory and communicate it to a monitor is a major factor in the computer systems usefulness as an entertainment device. However, if a network card is attempting to perform a direct memory access write to the memory at the same time according to PCI 2.2 specification the pending graphics read is discarded. In a graphics system repeated pending read discards often result in discontinuous streams that appears as glitches on a monitor. Hence the rate at which data can be transferred among various peripheral devices without having to repeat read and write commands often determines whether the computer systems is suited for a particular purpose.

What is required is a system and method that minimizes discarding of a pending read transaction due to an arrival of a write request while maintaining appropriate transaction ordering. Appropriate transaction ordering should reduce the potential of deadlock situations or coherency problems when a pending read address is being process and a write request is received. The system and method should prevent a write transaction from writing to an address that is associated with a pending read transaction that is being processed.

SUMMARY OF THE INVENTION

The present invention is a system and method that minimizes discarding of a pending read transaction due to an arrival of a write request while maintaining appropriate transaction ordering. The transaction ordering of the present invention reduces the potential of deadlock situations and coherencey problems when a pending read address is being processed and a write request is received. The system and method of the present invention prevents a write transaction from writing to an address that is associated with a pending read transaction that is being processed. The read/write optimizing system and method of the present invention optimizes read performance while accepting write data in a PCI bus architecture. The present invention facilitates the continued processing of a pending read under appropriate conditions by inhibiting a write transaction request directed to the target.

In one embodiment of the read/write optimizing system and method of the present invention, a write transaction is inhibited by tracking or storing an inhibited write transaction target address if a pending read transaction address is not within a range of an inhibited write transaction address. For example, a target address associated with an inhibited write transaction is temporarily latched in a write address register until a pending read transaction is completed or terminated. During the same time frame the inhibited write transaction is also partially processed (e.g., write data is loaded in a target write buffer) if a target is prepared and a pending read transaction address does not come within a range of an inhibited write transaction address as the pending read and inhibited write transactions are processed.

DETAILED DESCRIPTION OF THE INVENTION

Reference will now be made in detail to the preferred embodiments of the invention, a system and method to optimize read performance while accepting write data in a PCI bus architecture, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

The present invention is a system and method to optimize read performance while accepting write data in a PCI bus architecture. The present invention operates during special transaction sequences in which a prior PCI transaction was a read transaction resulting in a pending read situation and a current PCI transaction is a write transaction that arrives before the pending read transaction is completed or terminated. The present invention tracks or stores target addresses associated with pending read transaction and inhibited write transaction until an appropriate condition for final processing occurs. As long a target is prepared and a pending read transaction address is not within a range of an inhibited write transaction address the present invention facilitates the continued processing of the pending read. During the same time frame the inhibited write is also partially processed if a target is prepared and a pending read transaction address is not within a range of an inhibited write transaction address.

Figure 1:
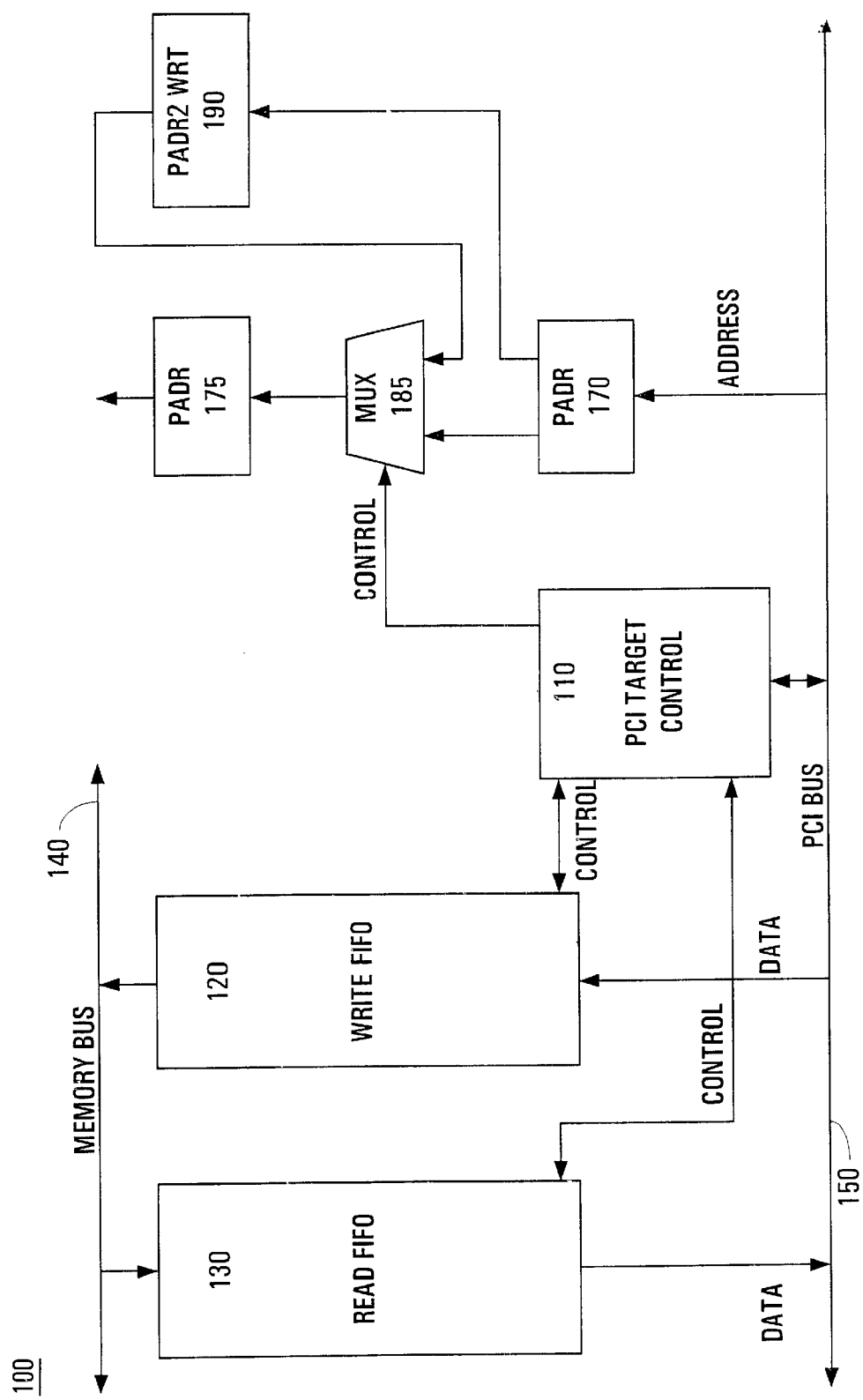
FIG. 1 is a block diagram of a read/write optimizing circuit of the present invention.

FIG. 1 is a block diagram of a read/write optimizing circuit 100 of the present invention. In one embodiment of the present invention, read/write optimizing circuit 100 acts as a bridge between a PCI bus and a main memory. When another PCI agent (not shown) attempts to write or read information from the main memory, the main memory acts as a target associated with read/write optimizing circuit 100. Read/write optimizing circuit 100 comprises PCI target control component 110, write FIFO buffer 120, read FIFO buffer 130, memory bus 140, PCI bus 150, a first address register PADR 170, a second address register PADR 175, multiplexer (MUX) 185 and write address register PADR2_WRT 190. PCI bus 150 is coupled to PCI target control component 110, write FIFO buffer 120, read FIFO buffer 130, first address register PADR 170 and MUX 185. Memory bus 140 is coupled to write FIFO buffer 120 and read FIFO buffer 130. First address register PADR 170 is coupled to write address register PADR2_WRT 190 and MUX 185 which is coupled to second address register PADR 175 and write address register PADR2_WRT.

The components of read/write optimizing circuit 100 cooperate to maintain an appropriate read/write transaction ordering that avoids deadlocks and coherency problems due to the order of read/write transactions. PCI bus 150 is adapted to provide communication paths between read/write optimizing circuit 100 and other PCI agents (other PCI master or PCI target devices not shown). Memory bus 140 provides a communication path between a main memory (not shown) and read/write optimizing circuit 100. PCI target control component 110 directs communication operations in accordance with PCI protocols and controls the loading of information in read FIFO buffer 130, write FIFO buffer 120 and second address register PADR 175 via MUX 185. Write FIFO buffer 120 stores write information on a first in first out basis as it is transferred from PCI bus 150 to memory bus 140. Read FIFO buffer 130 stores read information on a first in first out basis as it is transferred from memory bus 140 to PCI bus 150. First address register PADR 170 stores the address of the target the current PCI transaction is directed at. Second address register PADR 175 stores the information forwarded by MUX 185 (e.g., a PCI transaction address directed to the device or target associated with read/write optimizing circuit 100) during processing of the request by the target. Write address register PADR2_WRT 190 stores a target address during an inhibited write transaction if the write request is directed to the target associated with read/write optimizing circuit 100. MUX 185 selects whether the address in first address register PADR 170 or write address register PADR2_WRT 190 is forwarded to second address register PADR 175.

When a PCI master (not shown) initiates a PCI transaction and a frame# signal is asserted the address of the target associated with the PCI transaction is loaded in first address register PADR 170. Once the target address is latched in first address register PADR 170, PCI target control component 110 examines the address and the command byte enable to determine if the current PCI transaction is addressed to a target associated with read/write optimizing circuit 100. In one example the target associated with read/write optimizing circuit 100 is a main memory. If the current PCI transaction is addressed to the target associated with read/write optimizing circuit 100 and the target is ready to participate in the PCI transaction, PCI target control component 100 will direct first address register PADR 170 to transfer the current address for further processing.

Where the address from first register PADR 170 is forwarded depends upon the sequence of PCI transactions that occur prior to the current transaction. If a prior transaction is a read transaction and a current PCI transaction is a read PCI transaction and the target (e.g., a main memory) associated with read/write optimizing circuit 100 is ready to perform the PCI transaction (e.g., it is not already performing a read PCI transaction or waiting for a pending read to complete), then PCI target control component 110 signals first address register PADR 170 and MUX 185 to forward the address to second address register PADR 175. If a prior PCI transaction is a write transaction and a current PCI transaction is a write transaction and the target (e.g., a main memory) associated with read/write optimizing circuit 100 is prepared to perform the PCI transaction (e.g., write FIFO 120 is "empty" or "invalidated"), then PCI target control component 110 signals first address register PADR 170 and MUX 185 to forward the address to second address register PADR 175.

A special sequence of address transfers occurs in instances in which a prior PCI transaction was a read transaction resulting in a pending read situation and a current PCI transaction is a write transaction including postable write information that arrives before the pending read transaction is completed or terminated. In this situation an inhibited write transaction is performed during which read/write optimizing circuit 100 tracks an inhibited write transaction target address of the write request until an appropriate condition for final processing occurs. During the prior read transaction, PCI target control component signals first address register PADR 170 and MUX 185 to transfer the address associated with the prior read transaction into second address register PADR 175 until pending read operations are completed. In the current PCI transaction cycle the address associated with a current write transaction is latched in first address register PADR 170.

Once the target address is latched in first address register PADR 170, PCI target control component 110 examines the address and the command byte enable to determine if the current PCI transaction is addressed to a target associated with read/write optimizing circuit 100 (e.g., the main memory) and whether it is the same as or within a range of the pending read address. If the current write transaction is addressed to the target associated with read/write optimizing circuit 100 and it is not the same as or within a range of the pending read address, PCI target control component 110 signals write address register PADR2_WRT 190 to accept a transfer of the write transaction target address from first address register PADR 170. The pending read address in second address register PADR 175 is not discarded and the pending read request is permitted to continue waiting for the original read initiator to retry the target (e.g., main memory) .associated with read/write optimizing circuit 100 . PCI target control component 110 signals write FIFO buffer 120 to begin a partial write operation.

During a partial write operation write FIFO buffer 120 accepts the postable write information (not to exceed the available storage in write FIFO buffer 120) but inhibits the conclusion of the write transaction (e.g., transferring the write information from write FIFO buffer 120 to the target such as the main memory) until an appropriate continuation condition exists. As the write information is transferred into write FIFO buffer 120, PCI target control 110 tracks incremental changes in the write address and compares it to the pending read address stored in second address register PADR 175. If an incremented write address is the same as or is within a range of the pending read address stored in PADR 175, PCI target control 110 initiates a write disconnect and retry.

There are several conditions in which continuing the partial write transaction to completion is appropriate. If the pending read transaction is complete then it is appropriate to continue processing the write transaction. In some situations read FIFO buffer 130 finishes loading and PCI target control component 110 waits for the original read initiating master to retry the target associated with read/write optimizing circuit 100 (e.g., the main memory). For some period of time read FIFO buffer 130 and write FIFO buffer 120 include valid information. When the original read master retries the pending read transaction and the pending read transaction is complete, PCI target control component 110 signals MUX 185 to forward the address stored in write address register PADR2_WRT 190 associated with the inhibited write transaction. MUX 185 forwards the address to second address register PADR 175. PCI target control component 110 also directs write FIFO buffer 120 to download the postable write information stored in write FIFO buffer 120 onto memory bus 140.

As discussed above read/write optimizing circuit 100, PCI target control component 100 compares the pending read address to the inhibited write address. If the address of a current inhibited write transaction latched in write address register PADR2_WRT 190 does not fall within a range of the pending read address in second address register 175 the pending read continues with its normal operations and the inhibited write transaction continues to be inhibited in accordance with the scenarios discussed above.. In one example the range of addresses includes addresses within a cache line granularity or a page size of one another( e.g., for a DEC™ it is 128 bytes and for a Pentium™ it is a 64 bytes). When read/write optimizing circuit 100 is participating in a read or a write the second address register PADR 175 is incremented.

When an original initiator that initiated the pending read transaction retries the target associated with read/write optimizing circuit 100 (e.g., a main memory) and the pending read transaction is being completed the pending read address stored in second address PADR 175 is incremented. The pending read address in second address register PADR 175 is compared to the address in write address register PADR2_WRT after each incrementation as long as there is an inhibited write transaction address stored in write address register PADR2_WRT. If the incremented pending read address stored in second address register PADR 175 is within a range of the pending read address, PCI target control component 110 causes the pending read transaction to be invalidated and disconnected. Once the read is invalidated and disconnected, PCI target control component 110 also proceeds to complete the inhibited write transaction.

In another embodiment of the present invention, PCI target control component 110 does not wait for the prior pending read transaction to be fully completed on PCI bus 150. In this embodiment, PCI target control component 110 signals MUX 185 to forward the address stored in write address register PADR2_WRT 190 to second address register PADR 175 and completes the postable write transaction as soon as memory bus 140 is available, even though there is still pending read information in read FIFO 130 waiting for the original read master to retry the prior pending read transaction.

In yet another embodiment read/write optimizing circuit 100 includes a maximum memory write timer. When a prior PCI transaction includes a pending read transaction that has not been completed or terminated and a current PCI transaction is a write transaction including postable write information, PCI target control component 110 starts a timer (e.g. a programmable 256 clock). PCI target control component 110 then signals MUX 185 to transfer the address in PADR2_WRT 190 if the information associated with the pending read transaction has been loaded in read FIFO 130 and the pending read transaction is complete or terminated or the maximum memory write timer times out, which ever occurs first. In another embodiment of read/write optimizing circuit 100, a maximum memory write timer is started when a write transaction is retried because its address is within range of a pending read address stored in second address register PADR 175. If the timer expires before the initiator that originated the pending read retries the target associated with read/write optimizing circuit 100, then the pending read is invalidated and disconnected.

Figure 2:
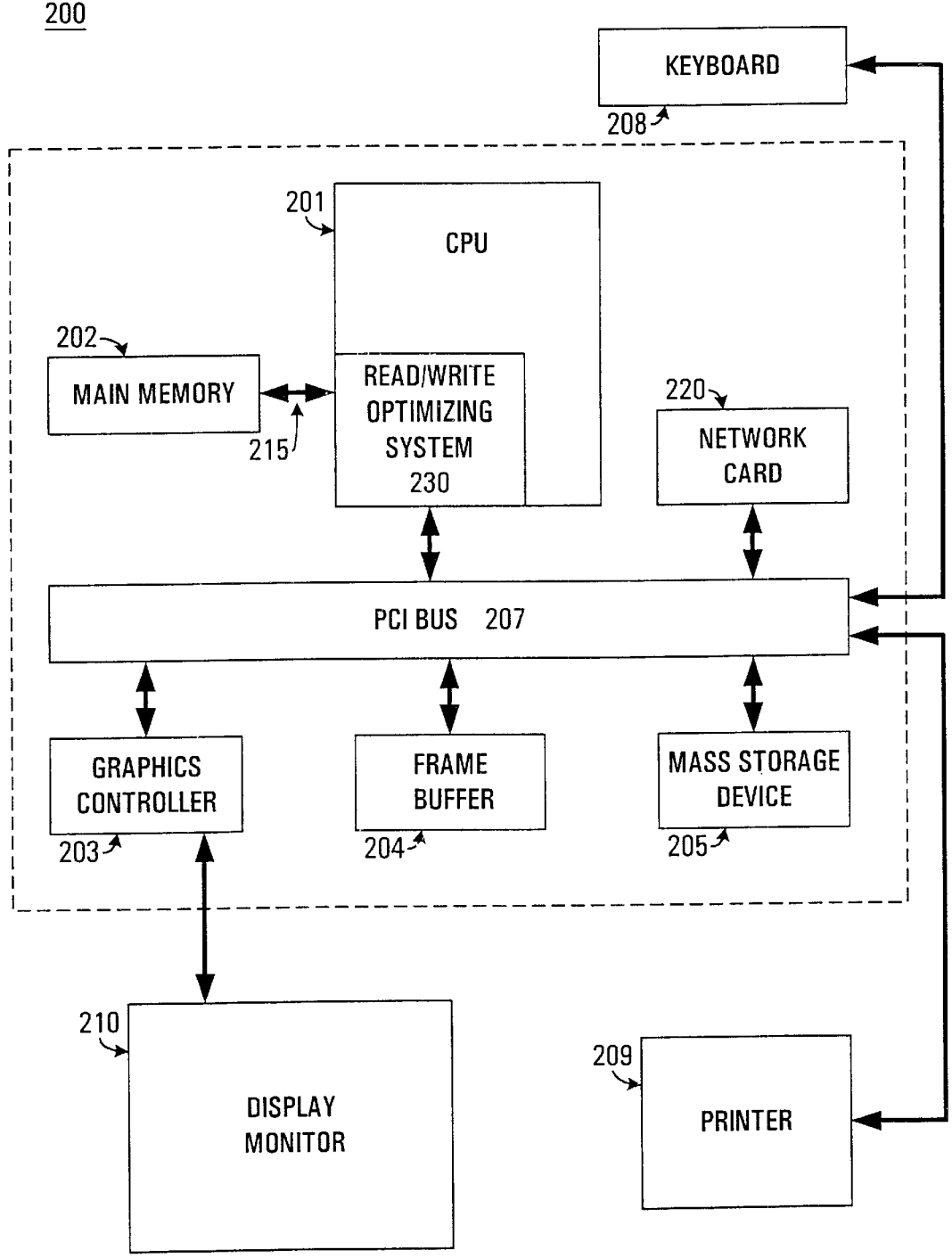
FIG. 2 shows a schematic of one embodiment of a read/write optimizing computer system implementation of the present invention.

FIG. 2 shows a schematic of one embodiment of a read/write optimizing computer system 200 implementation of the present invention. Computer system 200 comprises a graphics controller 203, frame buffer 204, mass storage device 205, network card 220, keyboard 208, printer 209, display monitor 210, PCI bus 207, memory bus 215, a main memory 202 and a central processing unit (CPU) 201 which includes a read/write optimizing system. Central processing unit 201, graphics controller 203, frame buffer 204, mass storage device 205, network card 220, keyboard 208, and printer 209 are coupled to PCI bus 207. Memory bus 215 is coupled to central processing unit (CPU) 201 and main memory 202. Display monitor 210 is coupled to graphics controller 203.

The components of read/write optimizing computer system 200 cooperatively operate to run computer applications and process data. CPU 201 handles most of the system control and processing. CPU 201 also includes a read/write optimizing system 230 adapted to optimize read performance while accepting write data in a PCI bus architecture. In one embodiment of the present invention the read/write optimizing system 230 is similar to read/write optimizing circuit 100. Main memory 202 provides convenient storage of data for quick retrieval by CPU 201. Graphics controller 203 processes image data in pipelined stages. Frame buffer 204 stores pixel parameter values. Mass storage device 205 stores data associated with multiple images and applications. Keyboard 208 operates as an input device. Printer 209 prints hard copies of graphical images and display monitor 210 displays graphical images. Network card 220 operates as an interface between computer system 200 and an external network (not shown). PCI bus 207 enables components coupled to PCI bus 207 to communicate with each other by carrying electrical signals between them.

The components coupled to bus 207 act as PCI initiators (masters) or PCI targets (slaves). For instance, graphics controller 203 acts as an initiator when it accesses PCI bus 207 to read information from main memory 202 and network card 220 acts as an initiator when it attempts to write network information to main memory 202. Main memory 202 acts as a target in both of these situations. Information being read from or written to main memory 202 from PCI bus 207 is transmitted via read/write optimizing system 230. Read/write optimizing system 230 facilitates the tracking of inhibited write transactions from various PCI agents included in read/write optimizing computer system 200. Thus, read/write optimizing system 230 reduces the occurrence of pending reads from graphics controller 203 being discarded while network card 220 is attempting to transfer write information to main memory 202. Read/write optimizing system 230 enables computer system 200 to provide sufficient continuity of data streaming to present a desirable graphics display via display monitor 210 without excessive glitches due to pending read discards associated with write attempts to main memory 202 by network card 220.

Figure 3:
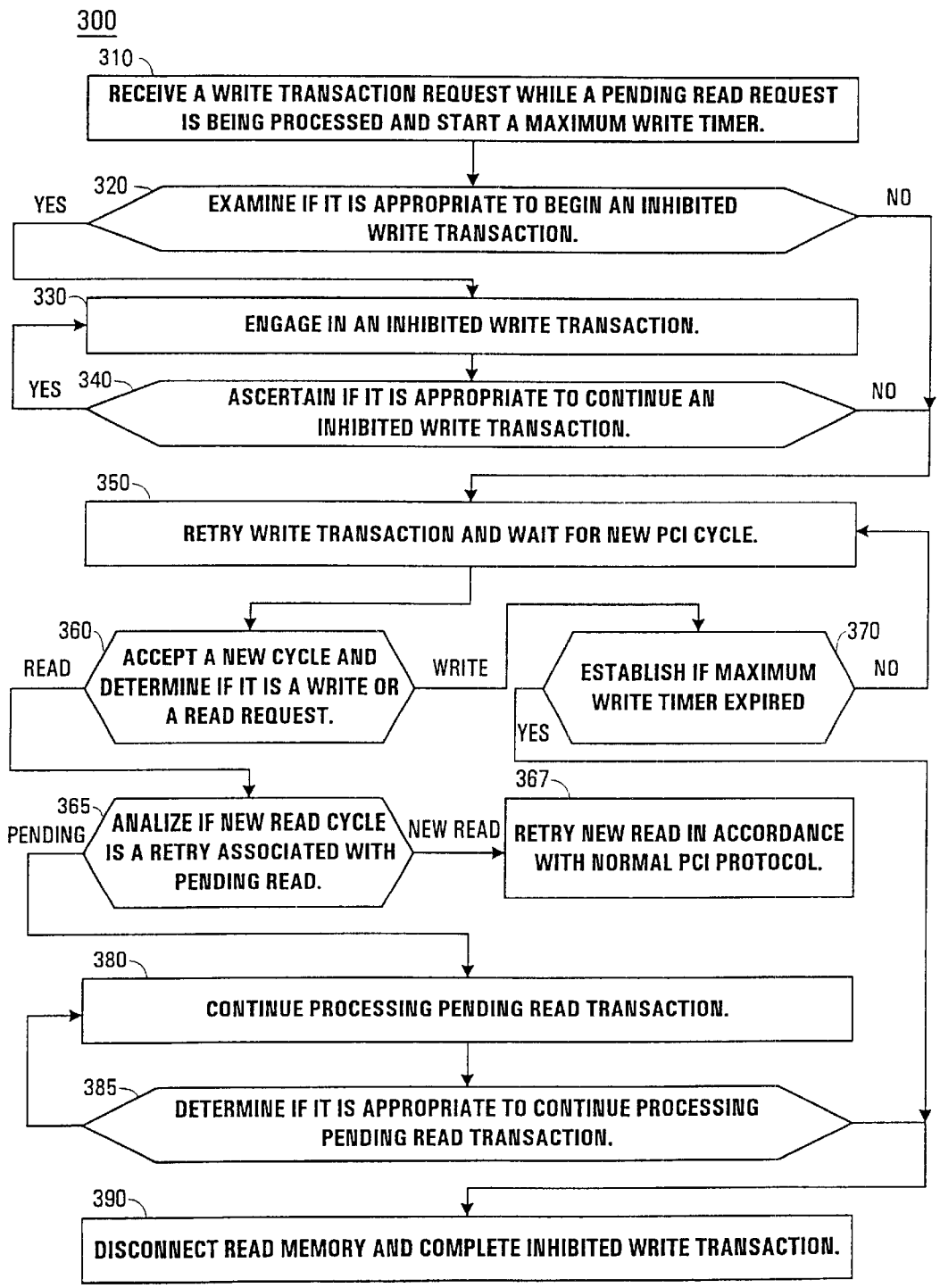
FIG. 3 is a flow chart of a read/write optimizing method, one embodiment of the present invention.

FIG. 3 is a flow chart of read/write optimizing method 300, one embodiment of the present invention. Read/write optimizing method 300 optimizes read performance while accepting write data in a PCI bus architecture. Read/write optimizing method 300 facilitates the continued processing of a pending read under appropriate conditions, even when a write transaction request is directed to a target by inhibiting the write transaction. In one embodiment of read/write optimizing method 300 the write transaction is inhibited by tracking or storing an inhibited write transaction target address. During the same time frame the inhibited write is also partially processed if a target is prepared and a pending read transaction address is not within a range of an inhibited write transaction address .

In Step 310 read/write optimizing method 300 determines if a pending read transaction is being processed (e.g., waiting for a read request retry from a master) when a write request is addressed to and arrives at a target processing the pending read transaction. If a write request arrives at a target while it is engaged in a pending read scenario read/write optimizing method 300 starts a maximum write timer and proceeds to Step 320, otherwise read/write optimizing method 300 processes information in accordance with normal PCI procedures.

In Step 320 read/write optimizing method 300 examines if it is appropriate to begin an inhibited write transaction. In one embodiment of the present invention read/write optimizing method 300 compares the address of the write request to the address of the pending read transaction. If the address of the write request matches or is within a range of the address of the pending read transaction, read/write optimizing method 300 proceeds to Step 350. For example, in one embodiment of read/write optimizing method 300 the range size corresponds to a cache line boundary or page size. If the address of the write request does not match or is not within a range of the pending read, read/write optimizing method 300 proceeds to Step 330.

Read/write optimizing method 300 engages in an inhibited write transaction in Step 330. In one example of read/write optimizing method 300, an inhibited write transaction includes partially performing the write transaction by accepting the write request and data phases while a write buffer is not full or the master initiating the inhibited write transaction does not terminate the inhibited write transaction. Once the write buffer is full, read/write optimizing method 300 disconnects the inhibited write transaction and continues to inhibit it. However, read/write optimizing method 300 discards the inhibit write transaction if the original master that initiated the inhibit write transaction terminates it. In one embodiment of the present invention, read/write optimizing method 300 inhibits the write transaction by storing the address of the inhibit write transaction. Read/write optimizing method 300 also stores write information in one example of the present invention, at least up to a point where the target write buffers are full. As the target accepts data phases read/write optimizing method 300 increments the target address and after each incrementation proceeds to step 340.

Read/write optimizing method 300 ascertains if it is appropriate to continue an inhibited write transaction in Step 340. In one embodiment of the present invention read/write optimizing method 300 analyzes if an incremented target address associated with a partial performance of an inhibited write is within a range of an address of the pending read transaction. If the incremented write address associated with a partial performance of an inhibited write is within a range of a pending read address it is not appropriate to continue the inhibited write transaction. In one example of read/write optimizing method 300 it is not appropriate to continue an inhibited write transaction if a write memory buffer (e.g., write FIFO memory 120) fills up or if an initiator that started the write request terminates the write transaction. If it is appropriate to continue an inhibited write transaction read/write optimizing method 300 loops back to Step 330 and continues to engage in the inhibited write transaction. If it is not appropriate to continue an inhibited write transaction read/write optimizing method 300 proceeds to Step 350.

In Step 350 read/write optimizing method 300 issues a signal to the master that initiated the write request to retry the write request and waits for a new PCI cycle.

In Step 360 the target accepts a new PCI cycle and determines if it is a second write or a second read request. The second write or second read request are either an entirely new write or read request or a retry of a previous write or read request. If the new request is a read request, read/write optimizing method 300 proceeds to Step 365. If the new request is a write request, read/write optimizing method 300 proceeds to Step 370.

In step 365 read/write optimizing method 300 analyzes the read transaction to determine if it is a retry associated with a pending read or a different read transaction. If the read transaction is a retry associated with a pending read the process proceeds to step 380. If the read transaction is a new read not associated with a pending read the process proceeds to step 367 in which the new read is retried in accordance with standard PCI protocol.

In Step 370, read/write optimizing method 300 establishes if the maximum write timer expired. If the maximum write timer has not expired read/write optimizing method 300 loops back to Step 350. If the maximum write timer has expired read/write optimizing method 300 jumps to Step 390.

Read/write optimizing method 300 continues processing the pending read transaction in Step 380. Read/write optimizing method 300 increments the pending read address as the read transaction progresses and proceeds to step 385 after each incrementation.

In Step 385 read/write optimizing method 300 establishes if it is appropriate to continue processing the pending read transaction. In one embodiment of the present invention read/write optimizing method 300 examines the incremental changes in the pending read address and tests if an incremented read address is within a range of the inhibited write transaction. If an incremented read address associated with the pending read transaction is within a range of the inhibited write transaction it is not appropriate to continue with the pending read transaction. In one example of read/write optimizing method 300 it is not appropriate to continue a pending read transaction if the initiator that started the read request terminates the read transaction. If it is appropriate to continue a pending read transaction read/write optimizing method 300 completes the pending read transaction and then completes the inhibited write transaction. If it is not appropriate to continue the pending read transaction read/write optimizing method 300 proceeds to Step 390.

In Step 390 read/write optimizing method 300 disconnects a read memory buffer (e.g., read FIFO memory 130) and completes the inhibited write transaction. In one embodiment of the present invention read/write optimizing method 300 completes the inhibited write transaction by transferring an inhibited write address to a transaction processing register. For example, transferring an inhibited write address stored in write address register PADR2_WRT 190 to second address register PADR 175.

Thus, a read/write optimizing system and method of the present invention minimizes discarding of a pending read transaction due to an arrival of a write request while maintaining appropriate transaction ordering. The transaction ordering of the present invention reduces the potential of deadlock situations when a pending read address is being process and a write request is received. The system and method also prevents a write transaction from writing to an address that is associated with a pending read transaction that is being processed.

The foregoing descriptions of specific embodiments of the present invention have been presented for purposes of illustration and description.

They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A peripheral component interconnect (PCI) read/write optimizing circuit comprising:

a first address register adapted to store a target address;

a write address register coupled to said first address register, said write address register adapted to store said target address during inhibited write transactions;

a multiplexer coupled to said first address register and said write address register, said multiplexer adapted to select whether a target address in said first address register or said write address register is forwarded;

a second address register coupled to said multiplexer, said second address register adapted to store said target address forwarded by said multiplexer, and said second address register stores a pending read transaction target address associated with a pending read transaction and said write address register stores an inhibited write transaction target address associated with an inhibited write transaction if said inhibited write transaction target address is not within a range of said pending read transaction target address; and a PCI target control component coupled to said multiplexer, said PCI target control component adapted to direct communication operations in accordance with PCI protocols and control loading of said target address in said second address register via said multiplexer.

2. The peripheral component interconnect (PCI) read/write optimizing circuit of claim 1, further comprising:

a write buffer coupled to said PCI target control component, said write buffer adapted to store write information; and a read buffer coupled to said PCI target control component, said read buffer adapted to store read information.

3. The peripheral component interconnect (PCI) read/write optimizing circuit of claim 2, further comprising:
   a memory bus coupled to said read buffer and said write buffer, said memory bus adapted to provide a communication path between a memory and said read/write optimizing circuit; and
   a PCI bus coupled to said read buffer and said write buffer, said PCI bus adapted to provide communication paths between said read/write optimizing circuit and other PCI agents coupled to said PCI bus.

4. The peripheral component interconnect (PCI) read/write optimizing circuit of claim 1 in which said range is equal to a cache line granularity.

5. The peripheral component interconnect (PCI) read/write optimizing circuit of claim 1 in which said pending read transaction is processed as long as a master that originally initiated said pending read transaction does not terminate said pending read transaction and said master retries before a maximum write timer expires.

6. The peripheral component interconnect (PCI) read/write optimizing circuit of claim 1 in which said PCI target control component signals said multiplexer to select said inhibited write transaction target address from said write address register if said pending read transaction is complete and forward said inhibited write transaction target address to said second address register.

7. The peripheral component interconnect (PCI) read/write optimizing circuit of claim 1 in which said PCI target control component signals said multiplexer to select said inhibited write transaction target address from said write address register and forward said inhibited write transaction target address to said second address register if a master that originally initiated said pending read transaction terminates said pending read transaction.

* * * * *